US006019509A

United States Patent [19]

Speckbrock et al.

[11] Patent Number: 6,019,509

[45] Date of Patent: Feb. 1, 2000

[54] LOW MELTING GALLIUM, INDIUM, AND TIN EUTECTIC ALLOYS, AND THERMOMETERS EMPLOYING SAME

[75] Inventors: Gerd Speckbrock, Ilmenau; Siegbert Kamitz, Elgersburg; Marion Alt, Frankenhain; Heribert Schmitt, Geschwenda, all of Germany

[73] Assignee: Geraberger Thermometerwerk GmbH, Germany

[21] Appl. No.: 09/001,048

[22] Filed: Dec. 30, 1997

Related U.S. Application Data

[63] Continuation of application No. 08/387,921, Feb. 21, 1995, Pat. No. 5,800,060.

[30] Foreign Application Priority Data

Aug. 19, 1992 [DE] Germany ............................ 42 27 434

[51] Int. Cl.[7] .............................. G01K 3/04; G01K 5/22; G01K 5/10

[52] U.S. Cl. ....................... 374/201; 374/104; 252/408.1; 252/962; 600/549

[58] Field of Search .................................... 374/201, 104, 374/106; 252/408.1, 962; 420/555; 600/549

[56] References Cited

U.S. PATENT DOCUMENTS

| | | |
|---|---|---|
| 3,150,901 | 9/1964 | Esten et al. . |
| 4,076,637 | 2/1978 | Hurst . |
| 4,083,250 | 4/1978 | Goff et al. . |
| 4,627,741 | 12/1986 | Faller . |
| 4,647,224 | 3/1987 | Holm et al. . |
| 4,659,384 | 4/1987 | Daigo et al. . |
| 5,120,498 | 6/1992 | Cocks . |
| 5,198,189 | 3/1993 | Booth et al. . |

FOREIGN PATENT DOCUMENTS

| | | |
|---|---|---|
| 2 536 805 | 6/1985 | France . |
| 1144506 | 2/1963 | Germany . |
| 33 04 022 | 6/1987 | Germany . |
| 0101208 | 8/1975 | Japan . |
| 0012253 | 3/1982 | Japan . |
| 0116357 | 7/1984 | Japan . |
| 0123736 | 7/1984 | Japan . |
| 0135548 | 7/1985 | Japan . |
| 246843 | 6/1926 | United Kingdom . |

OTHER PUBLICATIONS

"Expanding fluid thermometer having thermally sensitive bulb" Brady, published O.G. No. 245622, Sep. 29, 1953.

J.M. Brady, Expanding Fluid Thermometer Having Thermally Sensitive Bulb, Published O.G. Sep. 29, 1953 (No. 245622).

E. Greil Wertheim, Glass Thermometers: Vacuum or Pressure Filled? , Date: Sep. 1972, Pertinent Pages: 1033–1040, see p. 1035 par. 5 –p. 1036, part. 1, Published in: GIT–Fachzeitschrift Fur Das Laboratorium, vol. 16 No. 9, Sep. 1972.

*Primary Examiner*—Diego Gutierrez
*Assistant Examiner*—Maria Fernandez
*Attorney, Agent, or Firm*—Brooks & Kushman P.C.

[57] ABSTRACT

A clinical thermometer with maximum function with a non-toxic eutectic Ga alloy as measuring fluid 14 inside a measuring tube 13 which provides adhesion forces larger than the cohesion forces inherent in liquid 14. To reach the maximum function, therefore, the customary Hick'sche constriction is not required any more facilitating production and handling of said clinical thermometer. Furthermore, a special Ga/In/Sn alloy is described, which may be used not only for clinical thermometers but also as a lubricant.

14 Claims, 1 Drawing Sheet

16
II II
15
10
13
12
11
14

LOW MELTING GALLIUM, INDIUM, AND TIN EUTECTIC ALLOYS, AND THERMOMETERS EMPLOYING SAME

This is a continuation of application(s) Ser. No. 08/387,921 filed on Feb. 21, 1995, now U.S. Pat. No. 5,800,060.

TECHNICAL FIELD

The present invention relates to a clinical thermometer with a maximum function and a eutectic mixture suited to it.

DESCRIPTION OF THE RELATED ART

In order to achieve the maximum function, conventional thermometers of this kind are filled with mercury and show a constriction between the bulb exposed to the temperature to be measured and the reading or measuring tube, which has the effect that in the cooling down process the mercury thread that entered the measuring tube separates.

Mercury is extremely poisonous and for health and environmental reasons is therefore increasingly met with disapproval.

Furthermore, in making the thermometer, an additional production step is necessary in order to create the constriction which requires a certain amount of precision so that the necessary inner cross-section is achieved which has to be small for the separation of the mercury thread but because of the throwing back not too small.

In accordance with U.S. Pat. No. 8,872,729 it was suggested to do without the problematic constriction and to coat the inside of the measuring tube to assure the necessary adhesion forces. The production of such a measuring tube is, however, very expensive and usually not very practical. Furthermore, it is necessary also with this thermometer to rely on toxic mercury.

So far, all attempts to produce a mercury-free clinical thermometer failed first of all because of the necessary maximum function. Similarly unsuitable are also the thermometers according to DE-PS 453 454, DE-PS 454 213 and GB-PS 246 843, which provide for the use of gallium with and without indium. Such thermometers have the disadvantage that their measuring liquid solidifies at low temperatures which may under certain circumstances result in the thermometer shattering.

Similar problems also arise when using a measuring liquid according to SU-PS 279 108.

SUMMARY OF THE INVENTION

Figure 1:
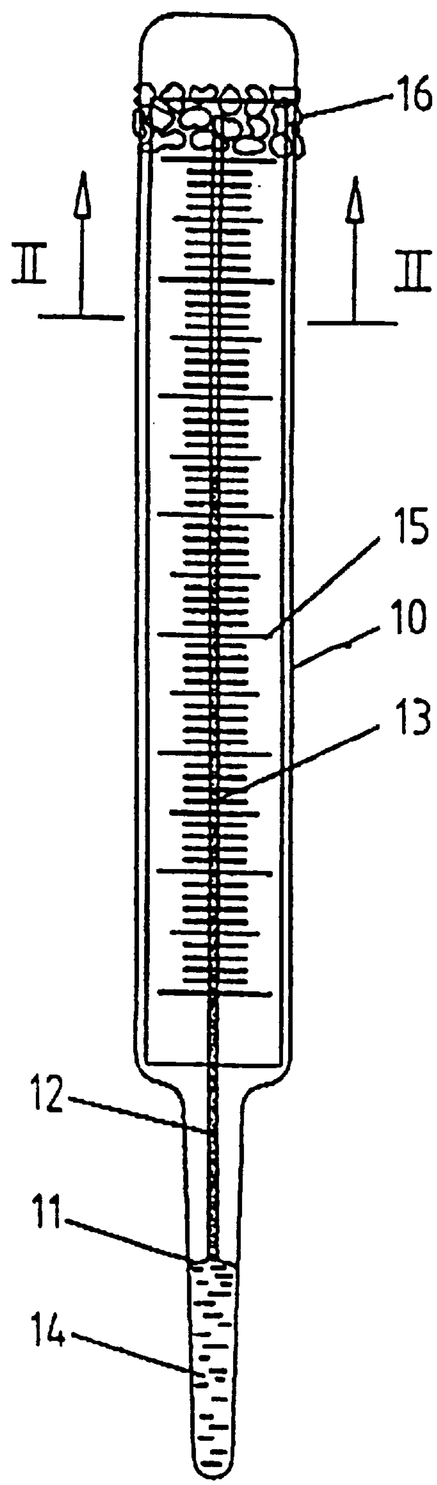
FIG. 1 illustrates one embodiment of a thermometer in accordance with the present invention.

The object of the present invention is therefore to specify the details of a thermometer with a maximum function which is simple to use, easy to produce and is harmless from the health and environmental standpoint.

DETAILED DESCRIPTION OF THE INVENTION

According to the invention the solution to the given problems is found by using a eutectic alloy containing gallium in a concentration of 65–95 wt.-%, indium in a concentration of 5–22 wt.-% and tin in a concentration of 0–11 wt.-%, if necessary.

The use of a eutectic gallium alloy as measuring liquid is of special significance because of its non-toxic characteristic. Furthermore, this liquid has a low melting point and a high vaporization point so that the necessary requirements of a clinical thermometer are met.

In this range of composition the liquid state of aggregation of the liquid extends from approx. −15° C. to more than +1800° C. under normal conditions. Gallium, indium and, if necessary, tin are preferential alloy elements because they lead to a particularly low eutectic point. Furthermore, this alloy is capable of conducting electricity so that it is also suitable for an embodiment as contact thermometer.

In a further embodiment of the present invention the eutectic alloy may contain up to 2 wt.-% bismuth and up to 2 wt.-% antimony. Antimony raises the oxidation resistance while bismuth positively affects the fluidity of the alloy. Furthermore, antimony and bismuth are, like tin, readily available and inexpensive substances, while gallium and indium are expensive. A content of more than 2 wt.-% of one of the two additional elements Sb and Bi leads to a noticeable and undesirable increase in the melting point.

In order to keep the liquid used for measuring and reading in the position of maximum wetting of the measuring tube, the adhesion forces inside the measuring tube must be greater than the cohesion forces active in the liquid. This is achieved, among others, by a water coating around the surface area of the measuring tube in contact with the liquid. Preferably this water coat is smaller than the permanent water coat which is normally on the surface of the measuring tube, so that a thin gallium oxide layer is formed which deposits on the surface of the measuring tube, increasing the adhesion forces inside the measuring tube. In this respect, one can do without the conventional constriction which simplifies not only the production but also the handling of the thermometer when deliberately returning the measuring thread.

One of the possible embodiments of the thermometer according to the invention has the measuring tube made of glass. It may show a non-circular preferably flat-oval to crescent-shaped cross-section. These characteristics serve to increase the adhesion forces between the measuring liquid and the measuring tube and therefore to guarantee when temperature decreases that the liquid thread is kept in place in the measuring tube which is necessary in order to achieve the desired maximum function.

According to claim 5 the actual measuring tube is connected to the bulb by an area which has an opening with a preferably circular cross-section in order to reduce the adhesion forces there. This results in a high operational reliability of the maximum function.

Thermometers with a measuring tube having a flat or crescent-shaped cross-section are known. This cross-sectional form has, however, so far been applied in the widening and improved readability of the mercury thread and not in increasing the adhesion.

The outer wall of the clinical thermometer, e.g. the glass housing enclosing the tube, may be provided with a grip element which is formed by several glass mass areas melted onto the housing to improve the grip of the thermometer. Preferably said melted-on glass mass areas are arranged in the form of one or more circumferential rings around the housing. When using coloured glass mass or glass paint a marking function, e.g. of the measuring range, or a reference that the clinical thermometer is filled with a non-toxic liquid can also be obtained.

Surprisingly it was found that a preferred eutectic mixture which contains 68–69 wt.-% gallium, 21–22 wt.-% indium and 9.5–10.5 wt.-% tin may be used for various other applications due to its special characteristics. Such a eutectic mixture is e.g. suitable as a lubricant especially for vacuum, high-vacuum and ultra-high vacuum applications.

The eutectic mixture according to the invention should, if possible, only have a small degree of impurity such as lead or zinc of less than 0.001 wt.-%, preferably less than 0.0001 wt.-%.

Said new eutectic mixture is mainly characterized by its low melting point of approx. −19.5° C. under normal pressure and atmospheric conditions. Furthermore, the vaporization point is above 1800° C.

Figure 2:
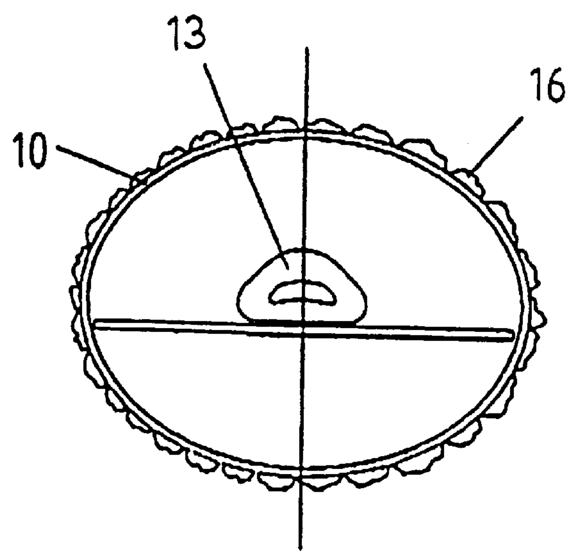
FIG. 2 illustrates a cross-section of the thermometer of FIG. 1 across II—II.

One embodiment of the clinical thermometer according to the invention is shown in the drawing, in which FIG. 1 shows the front view and FIG. 2 shows the cross-section along the II—II line of FIG. 1.

According to the drawing glass housing 10 encloses a bulb 11 with a measuring tube 13 arranged above the transition area 12. Bulb 11 is filled with said eutectic gallium alloy 14, which, as shown in FIG. 1, has risen inside measuring tube 13 to a certain height as a function of the temperature increase. The measuring tube area of the housing is provided with a scale 15.

Measuring tube 13 has, as shown in FIG. 2, a oval to nearly crescent-shaped cross-section to increase the adhesion between liquid 14 and measuring tube 13. Transition area 12 has an opening with a preferably circular cross-section to reduce the adhesion forces in this area ensuring the desired maximum function.

In the vicinity of the end opposing bulb 11 ten small irregular glass mass areas 16 are melted onto the outside of housing 10 forming a circumferential ring around housing 10. This ring does not only improve grip in this area of housing 10 but may also be used for colour coding.

We claim:

1. A low melting eutectic alloy having a melting point of −15° C. or below, consisting of a ternary gallium, indium, and tin eutectic base alloy of, in weight percent, 65–95% Ga, 5–22% In, Sn in an amount greater than zero percent and up to 11 percent, and inevitable impurities, and at least one further alloying element selected from the group consisting of an amount of Bi effective to raise the fluidity of the alloy and less than 2 weight percent based on the total weight of the alloy, and an amount of Sb effective to increase the oxidation resistance of the alloy and less than 2 weight percent based on the weight of the alloy.

2. In a thermometer having a measuring tube employing a column of liquid as the measuring fluid, the improvement comprising employing as said liquid the eutectic alloy of claim 1.

3. The thermometer of claim 2 wherein said thermometer is a clinical maximum-indicating thermometer.

4. A gallium, indium, and tin eutectic alloy, consisting of, in weight percent, 68–69% Ga, 21–22% In, 9.5–10.5% Sn, and optionally 0–2% Bi and 0–2% Sb, and inevitable impurities, wherein the melting point of said eutectic alloy is −15° C. or less.

5. The eutectic alloy of claim 4 wherein the melting point is about −19.5° C.

6. In a thermometer having a measuring tube employing a column of liquid as the measuring fluid, the improvement comprising employing as said liquid the eutectic alloy of claim 5.

7. The thermometer of claim 6 wherein said thermometer is a clinical maximum-indicating thermometer.

8. In a thermometer having a measuring tube employing a column of liquid as the measuring fluid, the improvement comprising employing as said liquid the eutectic alloy of claim 4.

9. The thermometer of claim 8 wherein said thermometer is a clinical maximum-indicating thermometer.

10. A low melting eutectic alloy having a melting point of −15° C. or below, consisting essentially of a ternary gallium, indium, base tin alloy of, in weight percent, 65–95% Ga, 5–22% In, Sn in an amount greater than zero and up to 11%, and inevitable impurities, and at least one further alloying element selected from the group consisting of an amount of Bi effective to raise the fluidity of the alloy and less than 2 weight percent based on the total weight of the alloy, and an amount of Sb effective to increase the oxidation resistance of the alloy and less than 2 weight percent based on the weight of the alloy.

11. The alloy of claim 10 which has a melting point of −19.5° C. or less.

12. In a thermometer having a measuring tube employing a column of liquid as the measuring fluid, the improvement comprising employing as said liquid the eutectic alloy of claim 10.

13. The alloy of claim 10, wherein Ga is present in an amount of 68–69%, In is present in an amount of 21–22%, and Sn is present in an amount of 9.5–10.5%.

14. In a thermometer having a measuring tube employing a column of liquid as the measuring fluid, the improvement comprising employing as said liquid the eutectic alloy of claim 13.

* * * * *